United States Patent
Nakanishi et al.

(10) Patent No.: US 6,649,563 B2
(45) Date of Patent: Nov. 18, 2003

(54) CERAMIC CARRIER AND CERAMIC CATALYST BODY

(75) Inventors: Tomohiko Nakanishi, Kariya (JP); Masanori Yamada, Nishio (JP); Yosiyasu Andou, Kakamigahara (JP)

(73) Assignees: Nippon Soken, Inc., Aichi (JP); Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/871,904

(22) Filed: Jun. 4, 2001

(65) Prior Publication Data

US 2002/0004455 A1 Jan. 10, 2002

(30) Foreign Application Priority Data

Jun. 5, 2000 (JP) ........................... 2000-167098
Apr. 20, 2001 (JP) ........................... 2001-122055

(51) Int. Cl.[7] ................................................ B01J 21/04
(52) U.S. Cl. ............ 502/439; 502/527.12; 502/527.13; 502/527.19; 502/527.21; 428/116; 422/122; 422/177; 422/180; 501/1; 501/94; 501/123; 501/133; 501/152; 501/154
(58) Field of Search ............................ 502/439, 527.12, 502/527.13, 527.19, 527.21; 428/116; 422/122, 177, 180; 501/1, 94, 123, 133, 152, 154

(56) References Cited

U.S. PATENT DOCUMENTS

| | | | |
|---|---|---|---|
| 5,151,254 A | * | 9/1992 | Arai et al. .................... 422/180 |
| 5,340,548 A | * | 8/1994 | Abe et al. .................... 422/177 |
| 5,494,881 A | * | 2/1996 | Machida et al. ............ 502/439 |
| 5,952,079 A | * | 9/1999 | Andou et al. ................ 428/116 |
| 6,254,963 B1 | * | 7/2001 | Kondo ......................... 428/116 |
| 6,261,990 B1 | * | 7/2001 | Terada et al. ................ 502/325 |
| 6,348,430 B1 | * | 2/2002 | Lindner et al. ............. 502/304 |

FOREIGN PATENT DOCUMENTS

| | | |
|---|---|---|
| JP | 06031139 A | 2/1994 |
| JP | 10118494 A | 5/1998 |
| JP | 10-137590 | 5/1998 |
| JP | 10165817 A | 6/1998 |

* cited by examiner

Primary Examiner—Mark L. Bell
Assistant Examiner—Patricia L. Hailey
(74) Attorney, Agent, or Firm—Nixon & Vanderhye P.C.

(57) ABSTRACT

A ceramic carrier and ceramic catalyst body used as $NO_x$ purification catalysts for lean burn engines, which are inexpensive, exhibit high temperature durability and can maintain their catalytic function for extended periods. The ceramic carrier has a diffusion-inhibiting layer formed on the surface of a cordierite honeycomb structure, to inhibit diffusion of alkali metals, alkaline earth metals, etc. carried as $NO_x$ storage materials. The diffusion-inhibiting layer is composed of a ceramic material such as $Y_2O_3$, NiO or $CeO_2$ which does not react with alkali metals or alkaline earth metals at temperatures of up to 1000° C. and has a melting point of higher than 1000° C., and the diffusion-inhibiting layer inhibits diffusion of catalyst components such as potassium into the interior to prevent their reaction with cordierite, so that the durability is greatly enhanced without reducing catalytic performance.

23 Claims, 6 Drawing Sheets

CERAMIC CARRIER AND CERAMIC CATALYST BODY

BACKGROUND OF THE INVENTION

1. Field of the Invention

The present invention relates to an exhaust gas purification catalyst for the purification of exhaust gas emitted from internal combustion engines of automobiles and the like and, specifically, it relates to a ceramic carrier which is ideal as a carrier for an exhaust gas purification catalyst in a lean burn engine or diesel engine, and to a ceramic catalyst body comprising it.

2. Description of the Related Art

"Three-way catalysts" have been widely used in the past for simultaneous purification of CO, HC and $NO_x$ emitted from automobiles. Recent years have brought a further demand for cleaner exhaust gas and reduced $CO_2$ emissions in order to protect the natural environment, and various "lean burn" systems have come into use to allow reduction in exhaust gas volumes through improved fuel efficiency. However, since conventional three-way catalysts have reduced $NO_x$ purification performance at the lean end (region of oxygen excess), the inherent performance cannot be exhibited; $NO_x$ storage reduction catalysts have therefore been developed to compensate for this problem. In addition to the precious metals, such as Pt and Rh, used for common three-way catalysts, $NO_x$ storage materials which store $NO_x$ in lean atmosphere conditions and release and purify stored $NO_x$ under stoichiometric (theoretical air/fuel ratio) to rich atmosphere conditions are added as cocatalysts, and the $NO_x$ storage materials are also used with highly basic alkali metals such as Na, K and Cs or alkaline earth metals such as Mg, Sr and Ba.

$NO_x$ storage reduction catalysts are described, for example, in Japanese Unexamined Patent Publication HEI No. 6-31139, which discloses a catalyst prepared by coating a porous body of γ-alumina, etc. onto a honeycomb carrier composed of a ceramic such as cordierite, a low thermal expansion material which has excellent heat resistance, and loading an alkali metal oxide and Pt, thereby allowing reduction in $NO_x$ emissions under lean conditions. However, since the HC purification performance is lowered if the basicity of the alkali metal used as the $NO_x$ storage material is too strong, the $NO_x$ storage material is selected to match the desired performance.

On the other hand, exhaust gas temperatures have also been increasing in recent years, making it important to improve the high temperature durability of exhaust gas purification catalysts. Incidentally, catalysts with alkali metals loaded as $NO_x$ storage materials on cordierite carriers have been associated with the problem of reduced $NO_x$ storage capacity and cordierite carrier impairment under higher exhaust gas temperatures. This is attributed to the fact that the alkali metal easily penetrates into the porous coating layer of γ-alumina and reacts with the Si in the cordierite; as a measure against this, Japanese Unexamined Patent Publication HEI No. 10-165817 proposes using a carrier made of a low thermal expansion material containing no Si, instead of a cordierite carrier.

However, of the α-alumina, zirconia, titania, titanium phosphate, aluminum titanate, stainless steel and Fe—Al—Cr alloy mentioned as examples in Japanese Unexamined Patent Publication HEI No. 10-165817, only the very highly dense (heavy) aluminum titanate exhibits a sufficiently low thermal expansion coefficient for practical use. Aluminum titanate, however, is poorly suited given the trend toward lighter weight vehicles and its high cost increases the cost of the metal carrier. Other ceramic materials have high thermal expansion coefficients, and are also impractical from the standpoint of impact resistance. Thus, it is the current situation that no low-cost carrier material with a low thermal expansion coefficient exists as a substitute for cordierite.

Japanese Unexamined Patent Publication HEI No. 10-137590 discloses an exhaust gas purification filter wherein an alkali metal and an alkaline earth metal are carried on a coating layer comprising at least one from among silica, zirconia, titania and silica-alumina provided on a ceramic carrier, and it is stated that the coating layer inhibits diffusion of the catalyst components into the filter. However, research by the present inventors has shown that these coating layer materials produce compounds by reaction with the alkali metals and alkaline earth metals under conditions of approximately 800° C., which is the temperature at which exhaust gas purification catalysts are generally used. That is, under high temperature conditions of 800° C. and above, the alkali metals and alkaline earth metals react with the coating layer, while the excess alkali metals and alkaline earth metals diffuse to the interior reaching the filter surface, and can also react therewith. Thus, under the current situation in which the maximum exhaust gas temperatures can reach up to around 1000° C., it has been difficult to inhibit diffusion of alkali metals and alkaline earth metals into coating layers made of such materials.

SUMMARY OF THE INVENTION

It is an object of the present invention to realize ceramic carriers and ceramic catalyst bodies which have low cost and excellent high temperature durability, while not exhibiting reduced catalytic performance due to reaction with the alkali metals and alkaline earth metals carried as cocatalysts and used as $NO_x$ storage materials, and which can maintain the necessary catalytic performance over long periods when used as exhaust gas purification catalysts in lean burn engines.

According to a first aspect of the invention there is provided a ceramic carrier prepared by forming a diffusion-inhibiting layer which inhibits diffusion of the carried catalyst components on the surface of a ceramic honeycomb structure, wherein the diffusion-inhibiting layer is composed of a ceramic material which substantially does not react with the catalyst components under the temperature conditions of use and which has a melting point that is higher than the maximum temperature of use.

Since the diffusion-inhibiting layer substantially does not react with the catalyst components at the use temperature of the catalyst, the catalyst components do not diffuse into the diffusion-inhibiting layer. Thus, it is possible to prevent the diffused-catalyst components from reaching the surface of the ceramic honeycomb structure and reacting with it. Also, since the diffusion-inhibiting layer has a melting point higher than the maximum use temperature of the catalyst, there is no loss of diffusion-inhibiting effect by melting. Consequently, the ceramic honeycomb structure can be constructed of inexpensive and high temperature durable cordierite and can maintain its catalyst performance over long periods, so that it is ideal as an exhaust gas purification catalyst for lean burn engines.

According to a second aspect, the ceramic carrier is one with a thermal expansion coefficient of no greater than $1.5 \times 10^{-6}/°$ C. in the direction of flow. This improves the thermal shock resistance and reduces the risk of thermal shock damage even when used as an exhaust gas purification catalyst through which high temperature exhaust gas flows.

According to a third aspect, the melting point of the ceramic material composing the diffusion-inhibiting layer is 1000° C. or higher. Since the maximum temperature never exceeds 1000° C. during use as an exhaust gas purification catalyst, a ceramic material with a melting point of 1000° C. or higher will not exhibit a reduced function due to melting of the diffusion-inhibiting layer.

According to a fourth aspect, the ceramic honeycomb structure is a material with reactivity for the catalyst components, for example, a ceramic material containing Si, according to a fifth aspect. Ceramic materials containing Si readily react with catalyst components such as $NO_x$ occluders, and in such cases, providing the diffusion-inhibiting layer can prevent deterioration by the reaction. Specifically, by using inexpensive cordierite with a low thermal expansion coefficient as the ceramic honeycomb structure as according to a sixth aspect, a considerable effect is achieved in terms of cost reduction and improved thermal shock resistance.

According to a seventh aspect, the catalyst components include at least one selected from among alkali metals and alkaline earth metals. These metals are used as $NO_x$ storage materials in exhaust gas purification catalysts and, specifically, according to an eighth aspect, potassium is suitable as a catalyst component due to its high $NO_x$ storage capacity. However, there is a concern regarding lower performance due to diffusion into the carrier, and using a ceramic carrier provided with a diffusion-inhibiting layer according to the invention can effectively prevent the diffusion.

According to a ninth aspect, the porosity of the diffusion-inhibiting layer is no greater than 50%. By forming a diffusion-inhibiting layer with a porosity of no greater than 50%, it is possible to suppress diffusion to prevent penetration of the catalyst components into the ceramic honeycomb structure under normal conditions of use.

According to a tenth aspect, the ceramic material composing the diffusion-inhibiting layer is a metal oxide containing at least one selected from among non α-alumina, Ni, Cu, Zn, Y and lanthanoid elements. These ceramic materials have melting points of above 1000° C. and do not react with the catalyst components according to the seventh aspect, so that their diffusion can be reliably inhibited to maintain catalytic performance.

According to an eleventh aspect, the thickness of the diffusion-inhibiting layer is no larger than the mean pore size of the ceramic honeycomb structure. If it is larger than the mean pore size, the pores of the honeycomb structure become clogged and adhesion to the coating layer of γ-alumina, etc. formed on the diffusion-inhibiting layer easily deteriorates, but this can be prevented by keeping the thickness lower than the mean pore size.

According to a twelfth aspect, the diffusion-inhibiting layer is formed by a dip method, a PVD method or a CVD method. All of these methods allow satisfactory formation of the diffusion-inhibiting layer on the surface of the ceramic honeycomb structure, to inhibit diffusion of the catalyst components.

According to a thirteenth aspect, the diffusion-inhibiting layer is formed by a dip method in which a series of steps including immersion in the dip solution, drying and firing is repeated a plurality of times. The fine cracks generated during the process of immersion in the dip solution, drying and firing are reduced by repeating the immersion in the dip solution, drying and firing, to allow formation of a higher quality diffusion-inhibiting layer with fewer cracks in the surface, and to thereby provide a greater effect of inhibiting diffusion of the catalyst components into the honeycomb structure under conditions of use.

According to a fourteenth aspect, the diffusion-inhibiting layer is formed by a dip method in which the dip solution used is a slurry prepared by uniformly dispersing particles of the ceramic material into a water-soluble or water-insoluble solvent. By immersion in a dip solution in which the ceramic particles are dispersed uniformly and preferably in the form of primary particles, it is possible to minimize the number of uncoated sections resulting from aggregation between the ceramic particles during drying and firing, and to minimize creation of cracks due to poor film thickness uniformity, for a greater effect of inhibiting diffusion of the catalyst components into the honeycomb structure under conditions of use.

According to a fifteenth aspect, the diffusion-inhibiting layer is formed by a dip method in which the dip solution used is a solution wherein a starting material for the ceramic material is uniformly present in ion form in a water-soluble or water-insoluble solvent. By immersion in a dispersion solution in which the metal elements of the ceramic material are uniformly present in ion form, followed by treatment in a prescribed gas atmosphere, it is possible to allow the dip solution to penetrate to the fine sections of the ceramic honeycomb structure, to form a diffusion-inhibiting layer with no uncoated sections for a greater catalyst component diffusion-inhibiting effect.

According to a sixteenth aspect, at least one intermediate layer is formed between the ceramic honeycomb structure and the diffusion-inhibiting layer, the intermediate layer comprising a ceramic material with a different thermal expansion coefficient and with a higher melting point than the maximum temperature of use.

The intermediate layer has a different thermal expansion coefficient than the ceramic honeycomb structure during the course of the temperature history including the diffusion-inhibiting layer formation temperature conditions and the temperature conditions in which the catalyst is used, so that stress and cracking in the diffusion-inhibiting layer is reduced, and the effect of the diffusion-inhibiting layer which inhibits diffusion of the catalyst components into the ceramic honeycomb structure can be adequately exhibited. Since the intermediate layer also has a melting point which is higher than the maximum use temperature of the catalyst, there is no reduction in the diffusion-inhibiting effect due to melting.

According to a seventeenth aspect, the thicknesses of the diffusion-inhibiting layer and the intermediate layer are no greater than the value of the mean pore size of the ceramic honeycomb structure. By limiting the thicknesses to a smaller value than the mean pore size, it is possible to prevent clogging of the honeycomb structure pores by formation of the diffusion-inhibiting layer and intermediate layer, and the consequent loss of adhesion with the coating layer of γ-alumina, etc. to the diffusion-inhibiting layer.

According to an eighteenth aspect, the intermediate layer is formed by a dip method, a PVD method or a CVD method. All of these methods allow satisfactory formation of the intermediate layer on the surface of the ceramic honeycomb structure, to increase the catalyst component diffusion-inhibiting effect of the diffusion-inhibiting layer.

According to a nineteenth aspect, the intermediate layer is formed by a dip method in which a series of steps including immersion in the dip solution, drying and firing is repeated a plurality of times. This gives a higher quality intermediate layer with fewer cracks in the surface, as according to the thirteenth aspect, and allows satisfactory formation of the diffusion-inhibiting layer thereover to effectively inhibit diffusion of the catalyst components.

According to a twentieth aspect, the intermediate layer is formed by a dip method in which the dip solution used is a slurry prepared by uniformly dispersing particles of the ceramic material into a water-soluble or water-insoluble solvent. This gives a higher quality intermediate layer with no uncoated sections or cracks, as with to the fourteenth aspect, and allows satisfactory formation of the diffusion-inhibiting layer to effectively inhibit diffusion of the catalyst components.

According to a twenty-first aspect, the intermediate layer is formed by a dip method in which the dip solution used is a solution wherein a starting material for the ceramic material is uniformly present in ion form in a water-soluble or water-insoluble solvent. This gives a higher quality intermediate layer with no uncoated sections or cracks, as with the fifteenth aspect, and allows satisfactory formation of the diffusion-inhibiting layer thereover to effectively inhibit diffusion of the catalyst components.

According to a twenty-second aspect, the mean primary particle size of the ceramic particles composing the diffusion-inhibiting layer and/or the intermediate layer is no greater than the mean pore size of the ceramic honeycomb structure. Preferably, as according to a twenty-third aspect, the mean primary particle size of the ceramic particles is limited to no greater than $1/10$ of the mean pore size of the ceramic honeycomb structure, so that the diffusion-inhibiting layer or intermediate layer can be evenly formed on the pore surfaces of the ceramic honeycomb structure, for a greater effect of inhibiting diffusion of the catalyst components in the honeycomb structure under conditions of use.

According to a twenty-fourth aspect, the ceramic material composing the intermediate layer may be a ceramic material with a different crystallinity, anisotropy, constituent components or compound composition than the ceramic materials composing the ceramic honeycomb structure and the diffusion-inhibiting layer, or else a mixture or composite compound of the ceramic materials composing the ceramic honeycomb structure and the diffusion-inhibiting layer. In either case, it is possible to satisfactorily form the diffusion-inhibiting layer thereover to inhibit diffusion of the catalyst components into the honeycomb structure.

A twenty-fifth aspect relates to a ceramic catalyst body, wherein a catalyst component-carrying layer containing the catalyst components is formed on the surface of a ceramic carrier according to any one of the first to twenty-fourth aspects, and it is obtained, for example, by forming a coating layer of γ-alumina, etc. on a ceramic carrier of the invention and loading it with a catalyst. Preferably, as according to a twenty-sixth aspect, the catalyst components carried on the catalyst component-carrying layer include at least potassium, and the ceramic carrier comprises a ceramic honeycomb structure and a diffusion-inhibiting layer formed on its surface to inhibit diffusion of potassium. The diffusion-inhibiting layer is composed of a ceramic material which has a higher melting point than the maximum temperature of use and which substantially does not react with potassium under the temperature conditions of use, so that it is possible to inhibit diffusion of potassium into the ceramic carrier and thus achieve both cost reduction and improved catalytic performance.

BRIEF DESCRIPTION OF THE DRAWINGS

FIG. 2($a$) is a schematic partial magnified cross-sectional view showing the construction of a ceramic catalyst body wherein a catalyst is carried on a ceramic carrier of the invention having a diffusion-inhibiting layer and an intermediate layer, and FIG. 2($b$) is a magnified view of section A of FIG. 2($a$).

DESCRIPTION OF THE PREFERRED EMBODIMENTS

Figure 1:
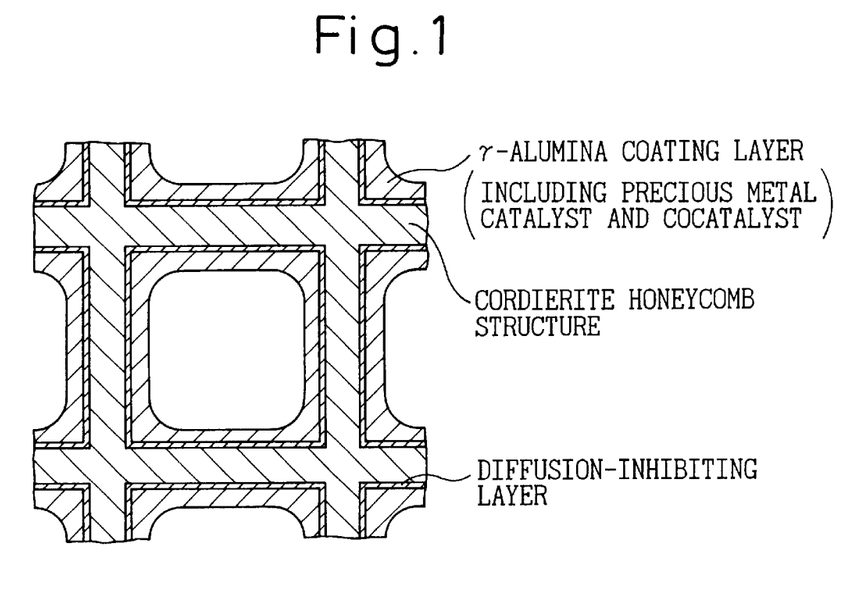
FIG. 1 is a schematic partial magnified cross-sectional view showing the construction of a ceramic catalyst body wherein a catalyst is carried on a ceramic carrier of the invention having a diffusion-inhibiting layer.
Figure 2A:
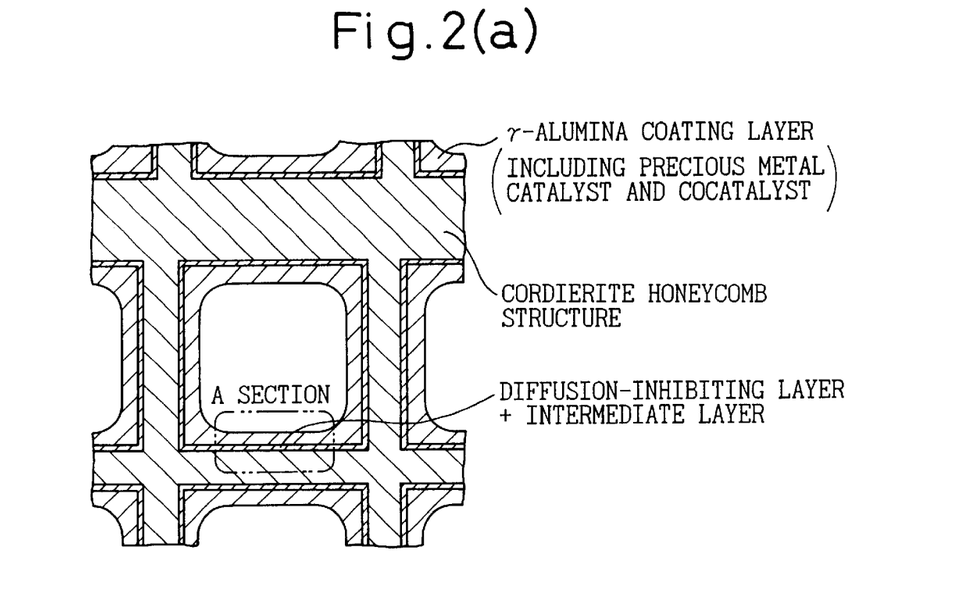
Figure 2B:
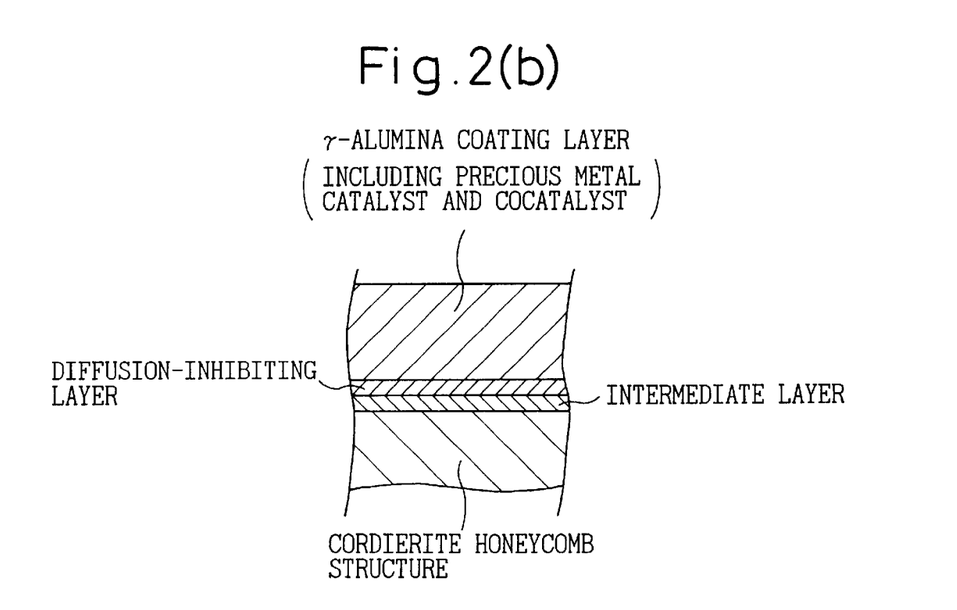

The present invention will now be explained in greater detail. As shown in FIG. 1, the ceramic carrier of the invention comprises a ceramic honeycomb structure composed of a ceramic material such as cordierite, and a diffusion-inhibiting layer formed on its surface to prevent diffusion of the carried catalyst components. If necessary, as shown in FIGS. 2($a$) and 2($b$), an intermediate layer may be formed between the ceramic honeycomb structure and the diffusion-inhibiting layer, having a different thermal expansion coefficient than these layers. A catalyst-loaded ceramic catalyst body having a coating layer of γ-alumina, etc. formed as a catalyst carrying layer containing the catalyst components on the surface of a ceramic carrier having such a construction is suitable as an exhaust gas purification catalyst for an internal combustion engine, such as a lean burn engine. Normally, a precious metal such as Pt is added to the catalyst along with a cocatalyst such as an $NO_x$ storage material. The $NO_x$ storage material contains, as a catalyst component, at least one type of metal selected from among alkali metals such as Na, K and Cs or alkaline earth metals such as Mg, Sr and Ba, with barium and potassium being preferably used because of their excellent $NO_x$ storage effects.

Cordierite is an oxide represented by the chemical formula $2MgO.2Al_2O_3.5SiO_2$. Cordierite is a low thermal expansion material, and is commonly used as a catalyst carrier because of its satisfactory heat resistance. Consequently, even when used as a ceramic carrier provided with a diffusion-inhibiting layer on the surface, the thermal expansion coefficient in the flow direction is maintained sufficiently low for improved thermal shock resistance under high temperature use. However, in the case of $NO_x$ storage exhaust gas purification catalysts it reacts with alkali metals and alkaline earth metals among the cocatalysts, and the reason has been shown to be the Si in the cordierite. The same problem occurs when Si-containing ceramic materials other than cordierite, such as SiC, $S_3N_4$ and mullite are used as the ceramic honeycomb structure material, or even when using ceramic materials without Si that are reactive with catalyst components.

The present invention provides a diffusion-inhibiting layer on the surface when using catalyst component-reactive ceramic honeycomb structures such as cordierite as ceramic carriers, to inhibit reaction between the catalyst components such as $NO_x$ storage materials and the ceramic honeycomb structure. The diffusion-inhibiting layer has low reactivity with catalyst components whose diffusion is to be inhibited, such as $NO_x$ occluders, under temperature conditions of use, and is composed of a ceramic material with a higher melting point than the maximum temperature of use. For an exhaust gas purification catalyst, the catalytic temperature during use is usually about 800° C. and may increase to a maximum temperature of up to near 1000° C., and therefore any ceramic material may be used that does not react with catalyst components such as alkali metals and alkaline earth metals at up to 1000° C. and which has a melting point of 1000° C. or above. When the melting point is below 1000° C., the diffusion-inhibiting layer melts at the maximum temperature of use, thus reducing the diffusion-inhibiting effect.

As specific examples of ceramic materials for the diffusion-inhibiting layer there may be mentioned metal oxides including at least one selected from among non-α-alumina such as γ-$Al_2O_3$, Ni, Cu, Zn, Y and lanthanoids such as La, Ce, Er, Yb, etc. These metal oxides are materials with low reactivity with alkali metals and alkaline earth metals which are used as $NO_x$ storage materials, and therefore they stop the catalyst components at the ceramic carrier surface and inhibit their diffusion to the interior. In order to achieve this effect, the porosity of the diffusion-inhibiting layer should be as low as possible, and preferably the porosity should be no greater than 50%.

Cracks present from the ceramic honeycomb structure to the surface can act as diffusion channels for catalyst components, and therefore the diffusion-inhibiting layer preferably has few cracks. Compared to low thermal expansion materials such as cordierite, the other common ceramic materials, including those for the diffusion-inhibiting layer, have larger thermal expansion coefficients. Consequently, if the diffusion-inhibiting layer is composed of a ceramic material with a larger thermal expansion coefficient than the cordierite of the cordierite honeycomb structure, then during use at high temperature or when the diffusion-inhibiting layer is formed at high temperature, peeling occurs due to the difference in thermal expansions, and cracks may be produced in either or both the diffusion-inhibiting layer and the ceramic honeycomb structure. Since the diffusion-inhibiting layer is formed to an adequate thinness compared to the honeycomb structure, it tends to warp with stress produced by-heat deformation, and the temperature difference produced between the inside and outside of the diffusion-inhibiting layer by the difference in thermal expansions of the diffusion-inhibiting layer and the honeycomb structure results in greater thermal stress and frequent cracking.

In such cases, at least one or more intermediate layers composed of a ceramic material with a different thermal expansion coefficient are formed between the ceramic honeycomb structure and the diffusion-inhibiting layer. The intermediate layers are also composed of a ceramic material with a higher melting point than the maximum temperature of use, and preferably a ceramic material with a melting point of 1000° C. or higher, for the same reasons given for the diffusion-inhibiting layer.

When the intermediate layer is composed of a ceramic material with a thermal expansion coefficient between that of the honeycomb structure and the diffusion-inhibiting layer, it functions as a thermal expansion buffer layer, whereas when it is composed of a ceramic material with a larger thermal expansion coefficient than the diffusion-inhibiting layer, it functions as a sacrificial layer against stress produced in the diffusion-inhibiting layer, and in both cases it prevents cracks from being produced in the diffusion-inhibiting layer and provides an effect whereby no diffusion channel is created for the catalyst components. However, when it is utilized as a sacrificial layer, the adhesive strength between the honeycomb structure, the intermediate layer and the diffusion-inhibiting layer is weakened to the point of possible peeling and, therefore, it is preferably constructed as a buffer layer.

The ceramic material for the intermediate layer may be a ceramic material with a different crystallinity, anisotropy, constituent components or compound composition than the ceramic material composing the ceramic honeycomb structure and the diffusion-inhibiting layer, or it may be a combination of materials, such as a mixture or composite compound layer, of the ceramic materials composing the ceramic honeycomb structure and the diffusion-inhibiting layer. Alternatively, a plurality of intermediate layers may be formed with gradually different constituent materials, to utilize the difference in thermal expansion coefficients for an effect of suppressing cracks in the diffusion-inhibiting layer. In any case, selection of a ceramic material with a thermal expansion coefficient near to that of the honeycomb structure and diffusion-inhibiting layer is advantageous for suppressing cracks due to differences in thermal expansion.

As specific examples of ceramic materials for the intermediate layer there may be mentioned $Al_2TiO_5$, ZnO, $Y_2O_3$, AlN, $TiO_2$, etc. In addition, oxides such as α-$Al_2O_3$, γ-$Al_2O_3$, $ZrO_2$, $CeO_2$, NiO, CuO, MgO, $La_2O_3$ and $Er_2O_3$ (also compound oxides) or carbides, nitrides and other non-oxides (also compound non-oxides) may also be used, and so long as the ceramic materials have different thermal expansion coefficients, the materials may be selected as buffer layers or sacrificial layers depending on the thermal expansion coefficients. Common thermal expansion coefficients of different ceramic materials may be found in the literature relating to ceramic materials (for example, "Ceramic Mechanical Properties", "Information on Materials", edited by the Japan Ceramics Society).

A method for fabrication of a ceramic carrier with the aforementioned construction will now be explained. When the ceramic honeycomb structure is made of cordierite, the cordierite starting material used will generally be an oxide such as talc, kaolin, alumina or the like, and these cordierite starting materials are mixed to the above-mentioned theoretical compositions, combined and kneaded with water and molding aids such as binders, lubricants and humectants and then subjected to extrusion molding to obtain a molded honeycomb. The molded honeycomb is heated in air for degreasing and then fired to fabricate a honeycomb structure.

The method of forming the diffusion-inhibiting layer and intermediate layer on the surface of the ceramic honeycomb structure may be a dip method in which the ceramic honeycomb structure is immersed in a dip solution containing the ceramic material for the diffusion-inhibiting inhibiting layer or intermediate layer. The dip solution may be prepared by any appropriate method, such as a method wherein fine particles of the desired ceramic material are dispersed in a solvent, or a method wherein a dip solution containing the desired ceramic material or its precursor is obtained by hydrolysis of a metal alkoxide as the starting material. By subsequent drying and firing by common methods, it is possible to form a diffusion-inhibiting layer. Alternatively, sputtering, vapor deposition such as a PVD or a CVD method using an organometallic gas may of course be used as publicly known thin film-forming techniques to form the diffusion-inhibiting layer.

One method that may be adopted as the method for forming diffusion-inhibiting layers and intermediate layers with few cracks by dipping is a method whereby a series of steps including immersion in the dip solution, drying and firing is repeated a plurality of times. This can fill in microcracks generated during the previous process of immersion, drying and firing, to eliminate cracks connecting to the surface. Generally speaking, solvents used for dip solutions are categorized into water-soluble and water-insoluble solvents, and the dip solutions are prepared by uniformly dispersing the ceramic particles or their starting material in such solvents. Preferably, the dip solution used has the ceramic particles uniformly dispersed in primary particle form without aggregation, and immersion of the honeycomb structure in such a dip solution can form a diffusion-inhibiting layer and intermediate layer uniformly, and to the desired film thickness, on the surface of the honeycomb structure.

The ceramic particles used to form the diffusion-inhibiting layer and intermediate layer preferably have a mean primary particle size which is no greater than the mean pore size of the ceramic honeycomb structure, to allow uniform formation of the diffusion-inhibiting layer and intermediate layer on the inner surfaces of the pores. It is preferably 1/10 of the mean pore size to allow even formation of the diffusion-inhibiting layer and intermediate layer to match the irregular shapes of the pore surfaces. The thickness of the diffusion-inhibiting layer and intermediate layer is preferably no greater than the value of the mean pore size of the ceramic honeycomb structure. The thickness of the diffusion-inhibiting layer and intermediate layer affects the adhesive strength during coating of the coating layer of $\gamma$-alumina, etc., and if the thickness of the diffusion-inhibiting layer and intermediate layer is larger than the value of the mean pore size, the pores of the ceramic honeycomb structure become covered with the diffusion-inhibiting layer and intermediate layer, such that the anchor effect is lost and the adhesive force of the subsequently coated coating layer is reduced, and peeling may occur due to the thermal expansion difference. In the case of cordierite, for example, the mean pore size is usually about 5 $\mu$m and, therefore, the thickness of the diffusion-inhibiting layer and intermediate layer may be about 5 $\mu$m or smaller. The mean primary particle size of the diffusion-inhibiting layer and intermediate layer may be about 0.5 $\mu$m or smaller.

As a method of forming a diffusion-inhibiting layer and intermediate layer on the surface of pores or cracks on the submicron level or smaller, there may be employed a method wherein the dip solution used is a solution of the ceramic starting material for the diffusion-inhibiting layer and intermediate layer uniformly dissolved, in ion form, in a water-soluble or water-insoluble solvent, and the honeycomb structure is thoroughly immersed in this dip solution and then subjected to sufficient treatment in a prescribed gas atmosphere. For example, using a dip solution containing the metal component ions of the ceramic material, heat treatment may be carried out in an oxidizing atmosphere in the case of oxides or in a nitrogen atmosphere in the case of nitrides. According to this method, the dispersion solution penetrates to the finer sections of the pores or cracks of the honeycomb structure to allow formation of the diffusion-inhibiting layer or intermediate layer on their surfaces, thereby blocking the route of diffusion of the catalyst components passing from the diffusion-inhibiting layer through to the inner honeycomb structure.

A coating layer of $\gamma$-alumina, etc. may be formed, by a publicly known method such as a dip method, on the surface of a ceramic carrier with a diffusion-inhibiting layer formed by the aforementioned method, and the catalyst loaded thereon to obtain a ceramic catalyst body. A precious metal catalyst such as Pt or a cocatalyst such as a $NO_x$ storage materials may be dispersed in a slurry containing y-alumina for loading of the catalyst simultaneously with formation of the coating layer, or the $\gamma$-alumina may be coated onto the ceramic carrier and then immersed in a solution containing the catalyst components and dried for loading.

The ceramic carrier with a diffusion-inhibiting layer obtained in this manner has a sufficiently small. thermal expansion coefficient of $1.5 \times 10^{-6}/°$ C. or lower in the flow direction, and hence there is very low risk of the ceramic carrier suffering damage by thermal shock at the high temperatures of use. Consequently, a ceramic catalyst body having a catalyst-carrying layer formed on the ceramic carrier may be suitably used as an automobile exhaust gas purification catalyst in a lean burn system, to exhibit both thermal shock resistance and catalytic performance. Since diffusion of the catalyst components such as $NO_x$ storage materials begins from about 600° C. in the conventional construction with no diffusion-inhibiting layer, there have been problems such as reduced catalytic performance resulting from diffusion of catalyst-components and deterioration of the carrier due to reaction with the catalyst components in use environments where the maximum temperature increases to about 1000° C. In contrast, according to the invention, the ceramic carrier surface is covered with a diffusion-inhibiting layer composed of a ceramic material with no reactivity for the catalyst components, and therefore the catalyst components do not diffuse into the diffusion-inhibiting layer nor into the ceramic honeycomb structure. This means that there is no risk of reduced catalytic performance or deterioration of the carrier, so that a ceramic catalyst body.can be realized which maintains its function over extended periods. There are no restrictions on the material for the ceramic honeycomb structure, and there may even be used ceramic materials containing Si which readily reacts with catalyst components; thus, cordierite can be used to obtain an inexpensive exhaust gas purification catalyst with excellent thermal shock resistance.

EXAMPLES

Examples and comparative examples will now be provided to demonstrate the effect of the invention.

The cordierite starting materials used were talc, kaolin, alumina and aluminum hydroxide, and powders of these materials were combined to near the theoretical composition of cordierite. Suitable amounts of binders, lubricants, humectants and water were added, and the mixtures were kneaded and extrusion molded into honeycomb shapes with 100 μm cell walls, a cell density of 400 cpsi (cells per square inch) and a diameter of 50 mm. The honeycomb structures were heated to 800° C. in air for degreasing, and then fired by being held at 1390° C. for 2 hours.

On the resulting honeycomb structures there were formed diffusion-inhibiting layers composed of $\gamma$-$Al_2O_3$, $Y_2O_3$, NiO, CuO, ZnO and the lanthanoid element oxides $La_2O_3$, $CeO_2$, $Er_2O_3$ and $Yb_2O_3$, by the coating methods indicated in Table 1, and ceramic carriers were fabricated by baking in air at 1000° C. (Examples 1–9). In addition, ceramic carriers were also fabricated (Examples 10–18) by forming diffusion-inhibiting layers in the same manner, but by also forming intermediate layers composed of $Al_2TiO_5$, ZnO, $Y_2O_3$, $Al_2O_3$ and $TiO_2$ by the coating methods indicated in Table 1 before formation of the same diffusion-inhibiting layers as Examples 1–9.

Of the coating methods, the "oxide method" is a dip method using a dip solution prepared with metal oxide fine particles, and the honeycomb structures were either subjected to pretreatment (chemical or electrochemical method) to facilitate loading or else a mechanical procedure (ultrasonic vibration, vacuum pump, centrifugal separation, etc.) was also included to accomplish even filling up to the pore surfaces. The "alkoxide method" is a dip method using a dip solution prepared with a metal oxide as the starting material. The "PVD" method is a method of using sputtering, vapor deposition or the like to form the film, with a metal target in an oxygen gas stream or with the corresponding oxide or non-oxide target in a gas stream of at least one type of inert gas, oxidizing gas such as nitrogen or oxygen or reducing gas such as hydrogen depending on the nature (material and quality) of the film to be formed, while the "CVD" method is a method of using at least one type of inert gas, oxidizing gas such as nitrogen or oxygen or reducing gas such as hydrogen, depending on the nature (material and quality) of the film to be formed, and introducing an organometallic gas under this gas stream to form the film. In the PVD method and CVD method, a gradient of temperature and pressure is created in the honeycomb structure and device gas flow channel to form a uniform film.

The thicknesses of the formed diffusion-inhibiting layers and intermediate layers are shown in Table 1, in which the mean pore sizes of all of the honeycomb structures were less than about 5 μm. The melting points of the oxides of the diffusion-inhibiting layers and intermediate layers were all 1000° C. or above (from 1026° C. to 2410° C.).

The obtained ceramic carriers were coated with potassium nitrate containing potassium as an $NO_x$ storage material, and after holding them at 900° C. for 5 hours, the thermal expansion coefficients in the flow direction and the crushing strengths in the flow direction were measured, giving the results listed in Table 1. The thermal expansion coefficients were measured with a push rod thermal expansion meter, and the average thermal expansion coefficients between 25° C. to 800° C. were evaluated. The crushing strengths of the honeycomb structures in the flow direction were determined as the pressure at which a 1-inch diameter, 1-inch length column cut out therefrom was crushed upon application of a load in the flow direction.

TABLE 1

| | Diffusion-inhibiting layer | | | Intermediate layer | | | Thermal expansion coefficient in flow direction ($\times 10^{-6}/°$ C.) | Crushing strength in flow direction (MPa) |
|---|---|---|---|---|---|---|---|---|
| | Material | Coating method | Film thickness (μm) | Material | Coating method | Film thickness (μm) | | |
| Example 1 | $\gamma$-$Al_3O_3$ | Oxide method | 2.5 | none | — | — | 1.2 | 10.5 |
| Example 2 | $Y_2O_3$ | Alkoxide method | 1.5 | none | — | — | 1.0 | 11.9 |
| Example 3 | NiO | PVD method | 0.5 | none | — | — | 1.2 | 11.5 |
| Example 4 | CuO | Oxide method | 2.0 | none | — | — | 1.2 | 12.3 |
| Example 5 | ZnO | CVD method | 0.7 | none | — | — | 0.9 | 11.4 |
| Example 6 | $La_2O_3$ | Alkoxide method | 1.7 | none | — | — | 1.2 | 12.2 |
| Example 7 | $CeO_2$ | Oxide method | 3.5 | none | — | — | 1.2 | 10.8 |
| Example 9 | $Er_2O_3$ | Oxide method | 1.8 | none | — | — | 1.2 | 11.3 |
| Example 9 | $Yb_2O_2$ | Oxide method | 1.2 | none | — | — | 1.1 | 11.0 |
| Example 10 | $\gamma$-$Al_2O_3$ | Oxide method | 0.8 | $Al_2TiO_5$ | Oxide method | 0.5 | 1.0 | 12.0 |
| Example 11 | $Y_2O_3$ | Alkoxide method | 1.0 | ZnO | Oxide method | 0.5 | 0.9 | 12.8 |
| Example 12 | NiO | PVD method | 0.5 | $Y_2O_3$ | Oxide method | 0.5 | 1.0 | 12.0 |
| Example 13 | CuO | Oxide method | 1.5 | ZnO | CVD method | 0.5 | 1.0 | 12.5 |
| Example 14 | ZnO | CVD method | 0.7 | $Al_2TiO_5$ | Oxide method | 0.5 | 0.8 | 12.2 |
| Example 15 | $La_2O_3$ | Alkoxide method | 1.2 | AlN | PVD method | 0.5 | 1.0 | 12.4 |
| Example 16 | $CeO_2$ | Oxide | 1.0 | $Al_2O_2$ | Alkoxide | 0.5 | 1.0 | 12.8 |

TABLE 1-continued

| | Diffusion-inhibiting layer | | | Intermediate layer | | | Thermal expansion coefficient | Crushing strength |
| --- | --- | --- | --- | --- | --- | --- | --- | --- |
| | Material | Coating method | Film thickness (μm) | Material | Coating method | Film thickness (μm) | in flow direction (×10$^{-6}$/° C.) | in flow direction (MPa) |
| Example 17 | Er$_2$O$_3$ | Oxide method | 1.3 | AlN | PVD method | 0.5 | 1.0 | 12.3 |
| Example 18 | Yb$_2$O$_2$ | Oxide method | 1.2 | TiO$_2$ | PVD method | 0.5 | 0.9 | 13.0 |

As comparative examples, cordierite honeycomb structures obtained by the same method as described above were used to fabricate ceramic carriers without forming diffusion-inhibiting layers, or forming diffusion-inhibiting layers composed of materials outside of the present invention listed in Table 1 (Comparative Examples 1–8). The thermal expansion coefficients in the flow direction and the crushing strengths in the flow direction were also measured for these ceramic carriers by the same tests as above, giving the results shown in Table 2. As can be seen in Tables 1 and 2, Comparative Example 1 in which no diffusion-inhibiting layer was formed had a high thermal expansion coefficient of 1.8×10$^{-6}$/° C. Since the thermal expansion coefficient of the cordierite honeycomb structure itself is usually low at about 0.5×10$^{-6}$/° C., it is thought that the high temperature heat treatment promoted diffusion of potassium into the cordierite, thus altering the composition. The crushing strength in the flow direction was also far below the 10 MPa considered necessary to withstand the load of assembly into a catalytic converter, thus indicating that a reaction between cordierite and potassium led to a major reduction in the crushing strength.

necessary to withstand the load of assembly into a catalytic converter. This indicates that diffusion of potassium was inhibited by the diffusion-inhibiting layers of Examples 1–9, so that no reaction occurred between the cordierite and potassium. The ceramic carriers of Examples 10–18 in which intermediate layers had been formed had even lower thermal expansion coefficients in the flow direction and high crushing strengths, thus demonstrating that the intermediate layers provided improved performance.

Figure 3:
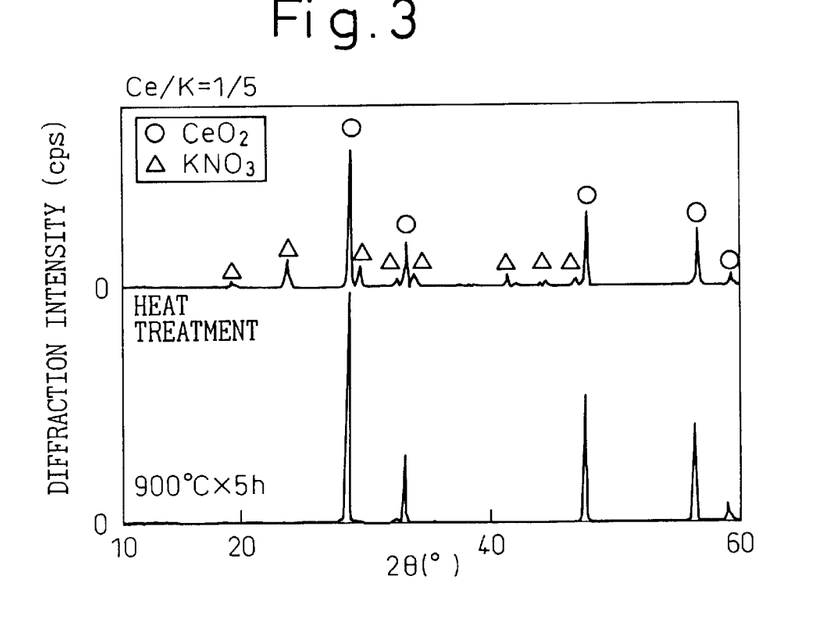
FIG. 3 is an X-ray diffraction chart showing the lack of reactivity between potassium and a diffusion-inhibiting layer forming material of the invention.

FIG. 3 is an X-ray diffraction chart showing the lack of reactivity between potassium and CeO$_2$ selected as the diffusion-inhibiting layer for Example 6. Powders of CeO$_2$ and potassium nitrate were mixed and heat treated at 900° C. for 5 hours, and examination of the changes before heat treatment (top of graph) and after heat treatment (bottom of graph) revealed no change in the CeO$_2$ peaks before and after heat treatment, thus confirming that it did not react with potassium.

The ceramic carriers with the diffusion-inhibiting layers of Comparative Examples 2–8 had thermal expansion coefficients in the flow direction of 1.6–1.9×10$^{-6}$/° C. which exceeded 1.5×10$^{-6}$/° C., while the crushing strengths were

TABLE 2

| | Diffusion-inhibiting layer | | | Intermediate layer | | | Thermal expansion coefficient | Crushing strength |
| --- | --- | --- | --- | --- | --- | --- | --- | --- |
| | Material | Coating method | Film thickness (μm) | Material | Coating method | Film thickness (μm) | in flow direction (×10$^{-6}$/° C.) | in flow direction (MPa) |
| Comp. Ex. 1 | none | — | — | none | — | — | 1.8 | 4.6 |
| Comp. Ex. 2 | α-Al$_2$O$_3$ (corundum) | Oxide method | 2.0 | none | — | — | 1.6 | 6.0 |
| Comp. Ex. 3 | TiO$_2$ | Alkoxide method | 1.6 | none | — | — | 1.7 | 5.1 |
| Comp. Ex. 4 | ZrO$_2$ | Alkoxide method | 1.7 | none | — | — | 1.6 | 6.5 |
| Comp. Ex. 5 | CoO | Oxide method | 2.5 | none | — | — | 1.8 | 4.1 |
| Comp. Ex. 6 | WO$_3$ | PVD method | 0.8 | none | — | — | 1.9 | 4.0 |
| Comp. Ex. 7 | Fe$_2$O$_3$ | Oxide method | 3.0 | none | — | — | 1.8 | 5.0 |
| Comp. Ex. 8 | Aluminum titanate | Oxide method | 6.0 | none | — | — | 1.6 | 4.8 |

Figure 4:
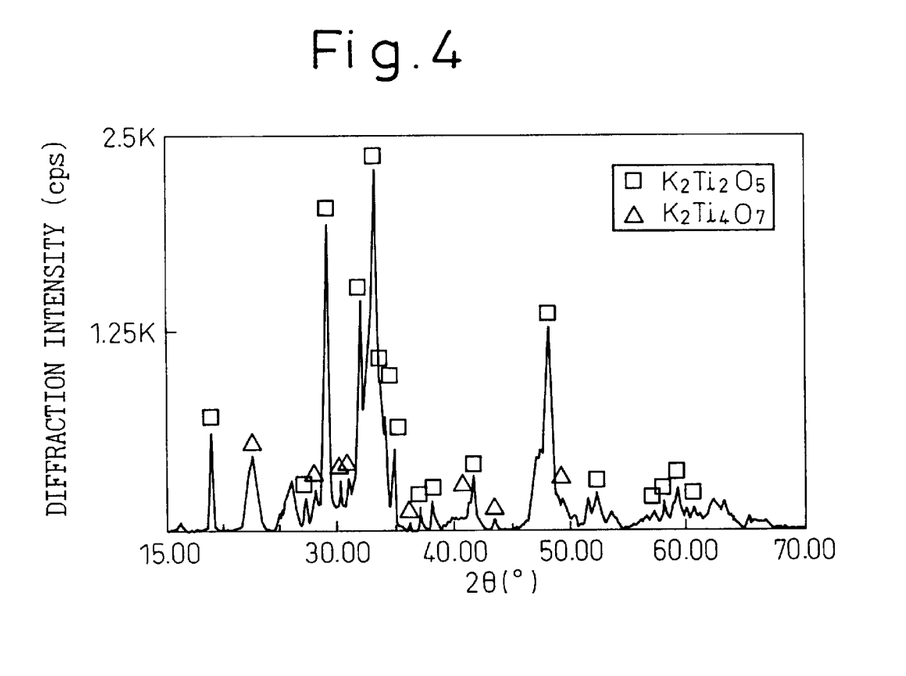
FIG. 4 is an X-ray diffraction chart showing reactivity between potassium and $TiO_2$ used as a comparison material for the examples of the invention.
Figure 5:
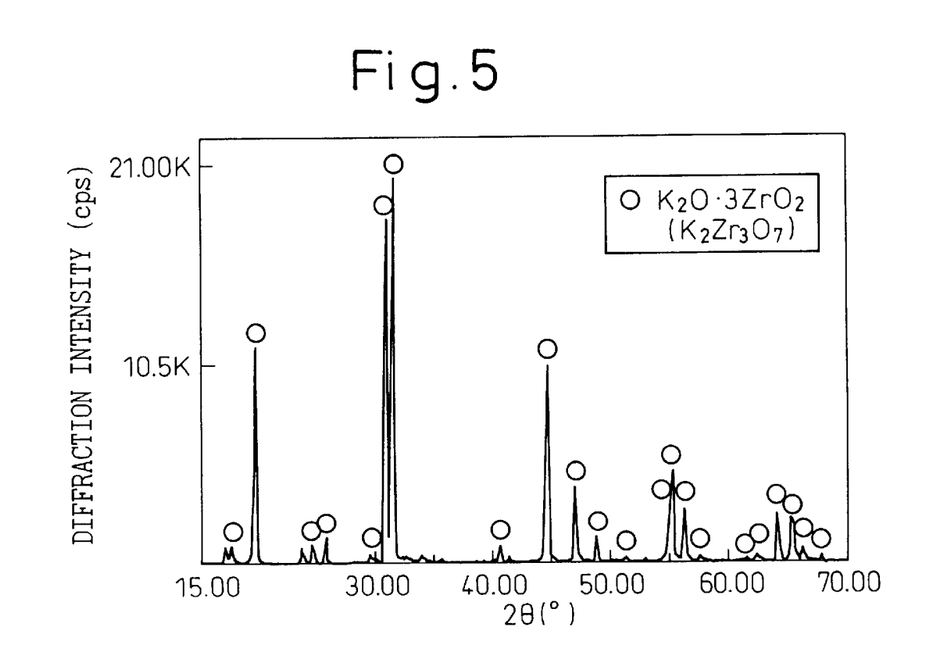
FIG. 5 is an X-ray diffraction chart showing reactivity between potassium and $ZrO_2$ used as a comparison material for the examples of the invention.

In contrast, the ceramic carriers of Examples 1–9 all had thermal expansion coefficients in the flow direction of 1.5×10$^{-6}$/° C. or lower, which is an adequately low level for practical use, and the crushing strengths in the flow direction were also at a satisfactory level of 10 MPa considered also 4.0–6.5 MPa, or far below 10 MPa, and therefore the materials clearly provided no diffusion-inhibiting effect. FIGS. 4 and 5 are X-ray diffraction charts showing that the TiO$_2$ and ZrO$_2$ of the diffusion-inhibiting layers of Comparative Examples 3 and 4 are reactive with potassium.

Upon mixing with potassium nitrate powder and after a heat treatment at 900° C. for 5 hours, peaks for the potassium reaction products $K_2Ti_2O_5$, $K_2Ti_4O_7$ (FIG. 4) and $K_2Zr_3O_7$ (FIG. 5) were seen, thus confirming that $TiO_2$ and $ZrO_2$ react with potassium.

Figure 6:
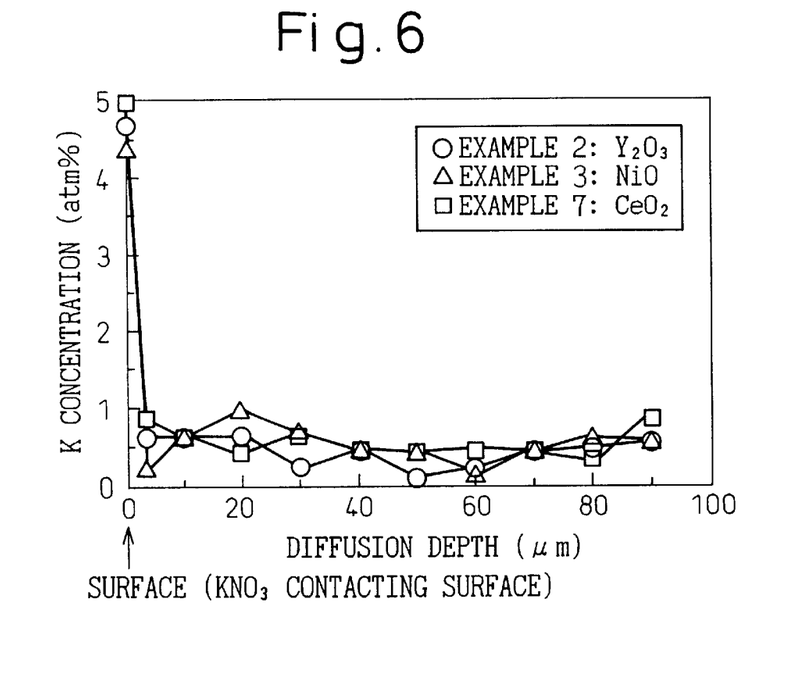
FIG. 6 is a graph showing the potassium concentration distribution inside the ceramic carriers of Examples 2, 3 and 7 of the invention.

In order to determine the condition of potassium diffusion into the heat treated honeycomb structures of the ceramic carriers with diffusion-inhibiting layers ($Y_2O_3$, NiO, $CeO_2$) of Examples 2, 3 and 7, the potassium concentrations were measured by EPMA up to a depth of 90 $\mu$m from the surfaces contacting with potassium nitrate, giving the results shown in FIG. 6. When no diffusion-inhibiting layer was formed, the value was 15 atm % (at a 100 $\mu$m diffusion depth), but as shown in the graph, the potassium-concentration up to a depth of 90 $\mu$m was low at 1 atm %, indicating that the diffusion-inhibiting layer inhibited diffusion of potassium.

Figure 7:
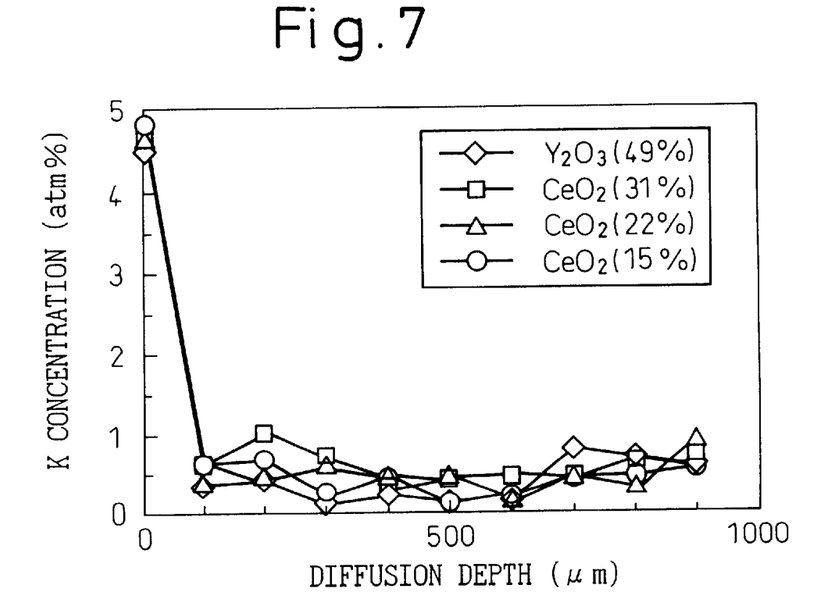
FIG. 7 is a graph showing the potassium concentration distribution inside diffusion-inhibiting layer forming materials of the invention with different void volumes.

FIG. 7 shows the results of determining the state of potassium diffusion in pellets prepared with a void volume of 49%, 31%, 22% and 15% using $Y_2O_3$ and $CeO_2$, where these were contacted with potassium nitrate powder and heat treated at 900° C. for 5 hours. The potassium concentrations of the pellet cross-sections after heat treatment were measured by EPMA up to a depth of about 1 mm from the surface contacting the potassium nitrate, and as shown in the graph, the potassium concentrations were all as low as 1 atm % or below (detection limit) in the pellets, except for the surfaces, thus indicating that potassium diffusion had been inhibited.

Figure 8:
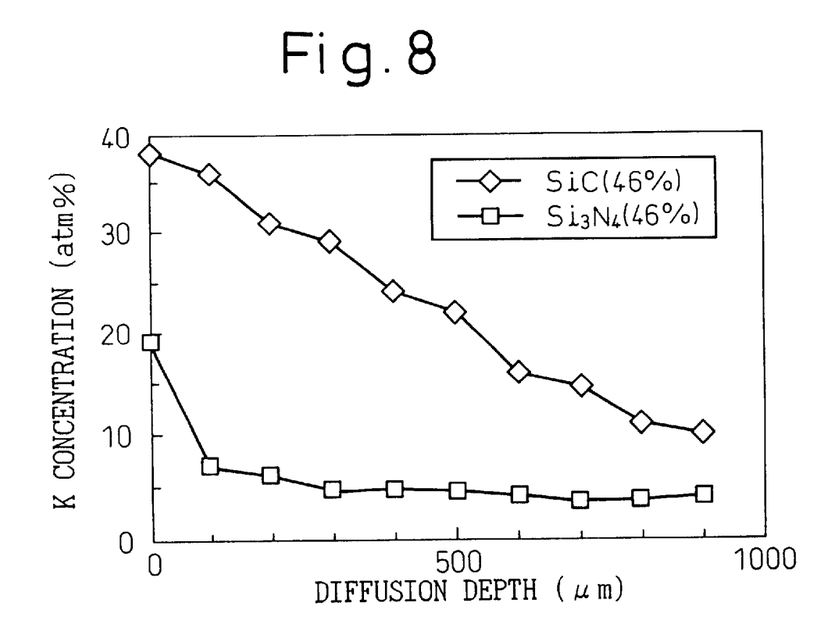
FIG. 8 is a graph showing the potassium concentration distribution inside Sic and $Si_3N_4$ as comparison materials.

FIG. 8 shows the results of determining the state of potassium diffusion in pellets of SiC, $Si_3N_4$ (porosity: 46%) prepared as comparison materials, where these were contacted with potassium nitrate powder and heat treated in the same manner. The potassium concentrations of the pellet cross-sections after heat treatment were measured in the same manner by EPMA up to a depth of about 1 mm from the surface contacting the potassium nitrate, and as shown in the graph, the potassium diffused into all of the pellet interiors.

Figure 9:
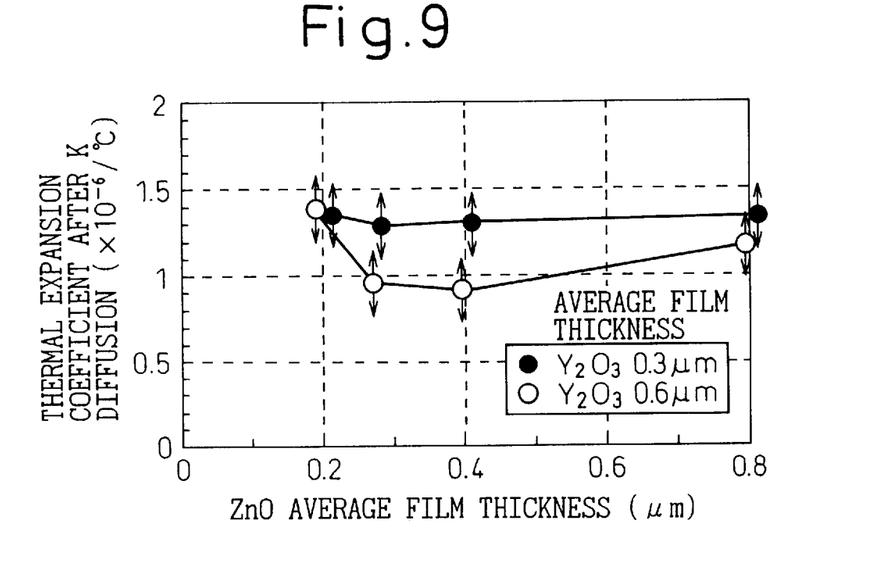
FIG. 9 is a graph showing the relationship between film thicknesses and the thermal expansion coefficients in the flow direction, for diffusion-inhibiting layers and intermediate layers.

FIG. 9 shows the relationship between layer thicknesses and ceramic carrier thermal expansion coefficients in the flow direction, for cordierite honeycomb structures having diffusion-inhibiting layers and intermediate layers formed to film thicknesses below the mean pore size. The ceramic carriers were fabricated using film thicknesses of 0.3 $\mu$m and 0.6 $\mu$m for the diffusion-inhibiting layer ($Y_2O_3$) and changing the film thickness of the intermediate layer (ZnO) between 0.2 and 0.8 $\mu$m, while the thermal expansion coefficients in the flow direction were measured by the method described above. As shown in the graph, the thermal expansion coefficients changed depending on the combination of film thicknesses of the intermediate layer (ZnO) and diffusion-inhibiting layer ($Y_2O_3$), indicating that optimum film thicknesses exist for both the intermediate layer and the diffusion-inhibiting layer. Since the thermal expansion coefficients and contraction rates differ according to the formation methods, materials and particle sizes for the intermediate layer and diffusion-inhibiting layer, it is expected that the optimum values will also differ depending on the combinations.

Figure 10:
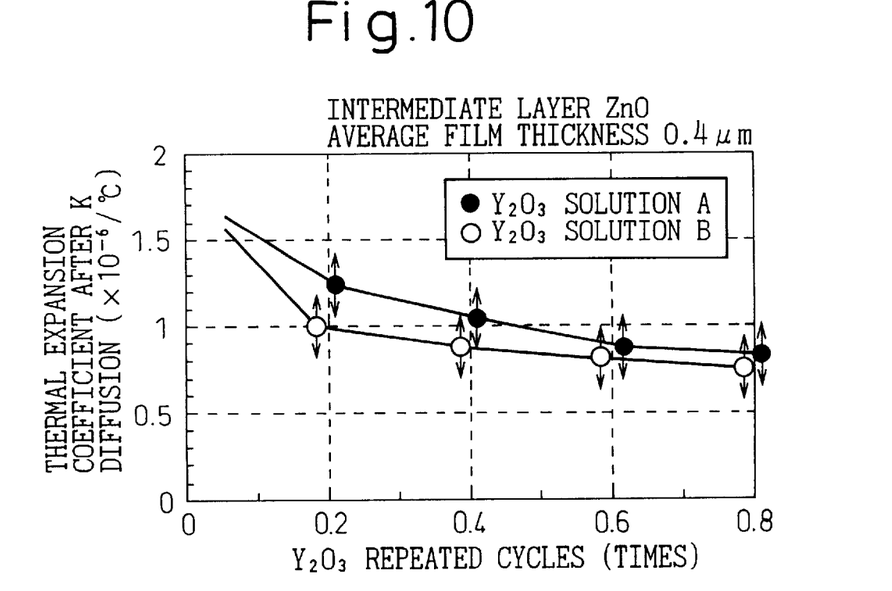
FIG. 10 is a graph showing the relationship between the number of repeated cycles of dipping and the thermal expansion coefficient in the flow direction.

FIG. 10 shows the relationship between the number of repeated cycles of dipping and the thermal expansion coefficient in the flow direction, where the diffusion-inhibiting layer ($Y_2O_3$) was formed by dipping with a series of steps including immersion in the dip solution, drying and firing, repeated a plurality of times. In this graph, $Y_2O_3$ solution A was a dip solution prepared using metal oxide fine particles, and $Y_2O_3$ solution B was a dip solution prepared using a metal alkoxide as the starting material. As clearly shown in this graph, an increased number of repeated cycles resulted in a lower thermal expansion coefficient in the flow direction, and it is conjectured that the fine cracks produced during the first course from immersion in the dip solution to firing were filled by the second and third repetitions. Thus, by employing a method of repeating the series of steps of dip solution immersion, drying and firing a plurality of times, it is possible to enhance the effect of inhibited diffusion.

Incidentally, although the above examples deal with diffusion of potassium as the catalyst component, it has been confirmed that the same effect is achieved even when other alkali metals or alkaline earth metals are loaded. Furthermore, it has also been confirmed that the same effect is achieved even when substances other than cordierite, such as SiC, $Si_3N_4$ and mullite, are used for the honeycomb structure.

What is claimed is:

1. A ceramic carrier prepared by forming a diffusion-inhibiting layer which inhibits diffusion of the carried catalyst components from a catalyst-carrying layer to the diffusion-inhibiting layer on a surface of a ceramic honeycomb structure and at least one intermediate layer formed between said ceramic honeycomb structure and said diffusion-inhibiting layer, wherein said diffusion-inhibiting layer is composed of a ceramic material which substantially does not react with said catalyst components under the temperature conditions of use and which has a melting point that is higher than the maximum temperature of use and said intermediate layer comprises a ceramic material with a different thermal expansion coefficient and with a higher melting point than the maximum temperature of use.

2. A ceramic carrier according to claim 1, wherein the thermal expansion coefficient in the flow direction is no greater than $1.5 \times 10^{-6}$/° C.

3. A ceramic carrier according to claim 1, wherein the melting point of the ceramic material composing said diffusion-inhibiting layer is 1000° C. or higher.

4. A ceramic carrier according to claim 1, wherein said ceramic honeycomb structure is a material with reactivity for said catalyst components.

5. A ceramic carrier according to claim 4, wherein said ceramic honeycomb structure is a ceramic material containing Si.

6. A ceramic carrier according to claim 5, wherein said ceramic honeycomb structure is cordierite.

7. A ceramic carrier according to claim 1, wherein said catalyst components include at least one selected from among alkali metals and alkaline earth metals.

8. A ceramic carrier according to claim 7, wherein said catalyst components include potassium.

9. A ceramic carrier according to claim 1, wherein the porosity of said diffusion-inhibiting layer is no greater than 50%.

10. A ceramic carrier according to claim 1, wherein the ceramic material composing said diffusion-inhibiting layer is a metal oxide containing at least one selected from among non α-alumina, Ni, Cu, Zn, Y and lanthanoid elements.

11. A ceramic carrier according to claim 1, wherein the thickness of said diffusion-inhibiting layer is no larger than the mean pore size of said ceramic honeycomb structure.

12. A ceramic carrier according to claim 1, wherein said diffusion-inhibiting layer is formed by a dip method, a PVD method or a CVD method.

13. A ceramic carrier according to claim 1, wherein said diffusion-inhibiting layer is formed by a dip method in which a series of steps, including immersion in the dip solution, drying and firing, is repeated a plurality of times.

14. A ceramic carrier according to claim 1, wherein said diffusion-inhibiting layer is formed by a dip method in which the dip solution used is a slurry prepared by uniformly dispersing particles of said ceramic material into a water-soluble or water-insoluble solvent.

15. A ceramic carrier according to claim 1, wherein said diffusion-inhibiting layer is formed by a dip method in which the dip solution used is a solution wherein a starting material for said ceramic material is uniformly present in ion form in a water-soluble or water-insoluble solvent.

16. A ceramic carrier according to claim 1, wherein the thickness of said diffusion-inhibiting layer is no greater than the mean pore size of said ceramic honeycomb structure.

17. A ceramic carrier according to claim 1, wherein said intermediate layer is formed by a dip method, a PVD method or a CVD method.

18. A ceramic carrier according to claim 1, wherein said intermediate layer is formed by a dip method in which a series of steps, including immersion in the dip solution, drying and firing, is repeated a plurality of times.

19. A ceramic carrier according to claim 1, wherein said intermediate layer is formed by a dip method in which the dip solution used is a slurry prepared by uniformly dispersing particles of said ceramic material into a water-soluble or water-insoluble solvent.

20. A ceramic carrier according to claim 1, wherein said intermediate layer is formed by a dip method in which the dip solution used is a solution wherein a starting material for said ceramic material is uniformly present, in ion form, in a water-soluble or water-insoluble solvent.

21. A ceramic carrier according to claim 1, wherein the ceramic material composing said intermediate layer is a ceramic material with a different crystallinity, anisotropy, constituent components or compound composition than the ceramic materials composing said ceramic honeycomb structure and said diffusion-inhibiting layer, or else a mixture or composite compound of the ceramic materials composing said ceramic honeycomb structure and said diffusion-inhibiting layer.

22. A ceramic catalyst body wherein, on the surface of a ceramic carrier according to claim 1, there is formed a catalyst component-carrying layer containing said catalyst components.

23. A ceramic catalyst body according to claim 22, wherein said catalyst components carried on said catalyst component-carrying layer include at least potassium, said ceramic carrier comprises a ceramic honeycomb structure and a diffusion-inhibiting layer formed on its surface to inhibit diffusion of potassium, and said diffusion-inhibiting layer is composed of a ceramic material which has a higher melting point than the maximum temperature of use and which substantially does not react with potassium under the temperature condition of use.

* * * * *